Figure 3:
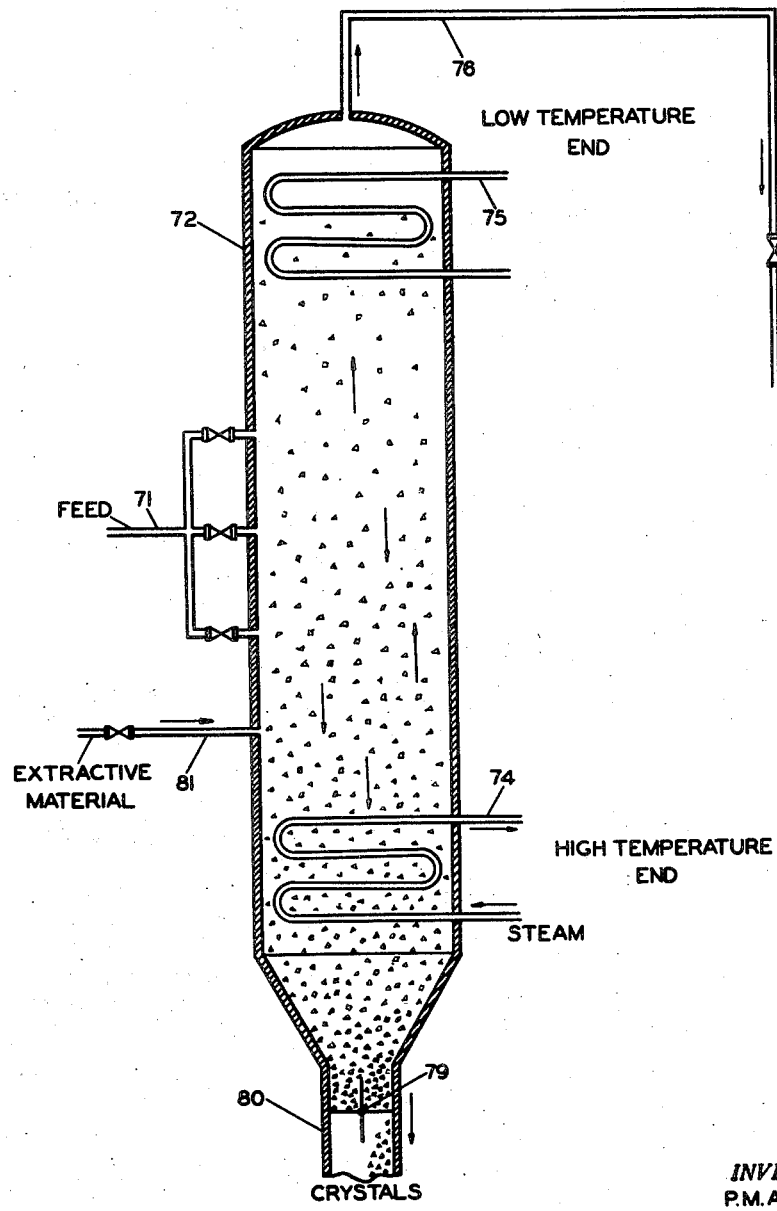

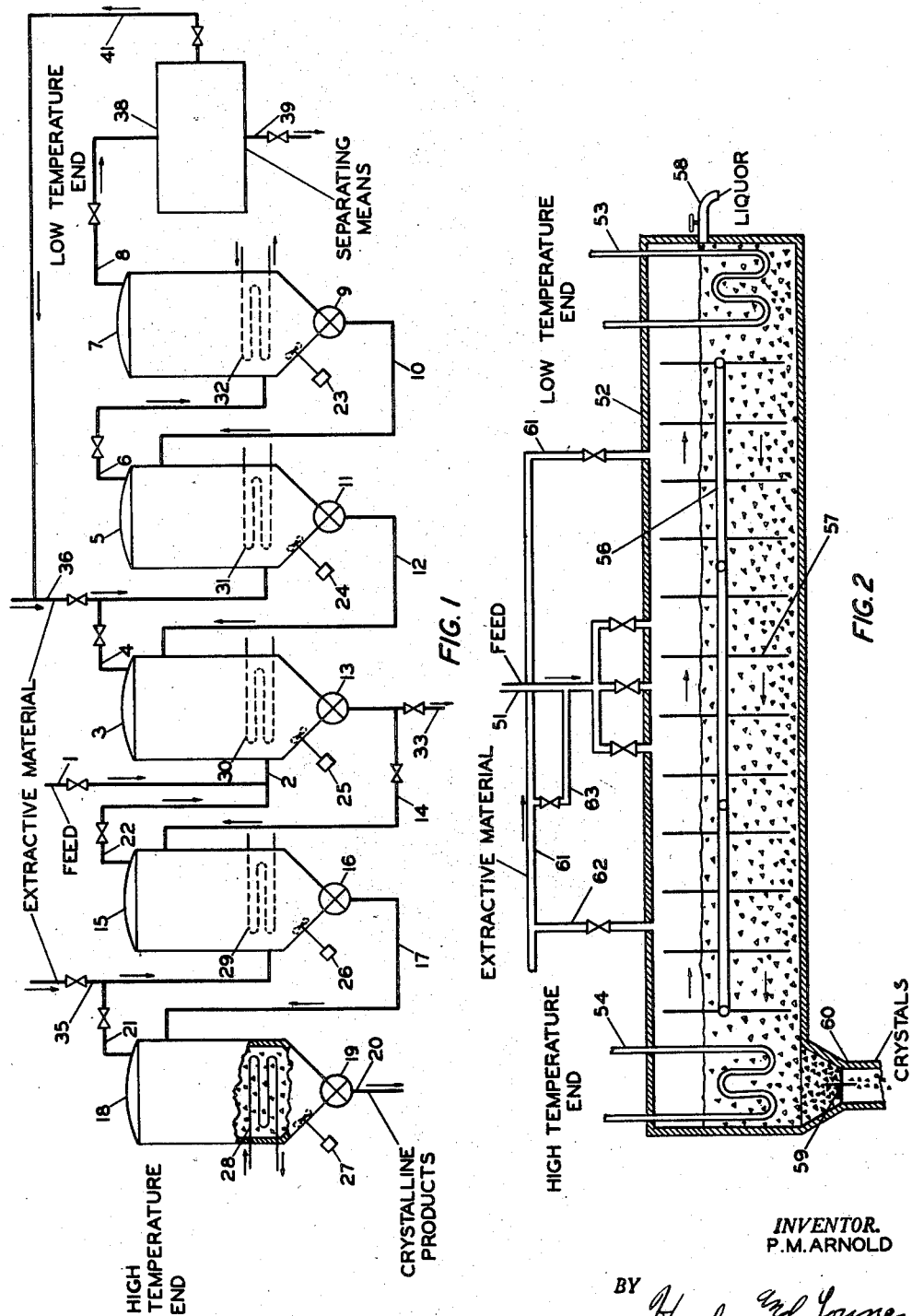

Patented Feb. 6, 1951

2,540,083

UNITED STATES PATENT OFFICE 2,540,083

CONTINUOUS EXTRACTIVE CRYSTALLIZATION PROCESS

Philip M. Arnold, Bartlesville, Okla., assignor to Phillips Petroleum Company, a corporation of Delaware Application December 29, 1945, Serial No. 638,409

11 Claims. (Cl. 260—666)

This invention relates to the separation of components of a multicomponent system. More particularly this invention relates to the separation and purification of mixtures by crystallization. In one embodiment, the invention relates to the separation and purification of the components of a two component system by a continuous extractive crystallization process.

In many industrial applications, chemical compounds are separated by means of crystallization where separation by distillation is impracticable or impossible. Separation by crystallization is very advantageous when dealing with materials which have relatively high boiling ranges, or with substances which are thermally unstable, or with solutions containing both volatile and nonvolatile impurities or undesired constituents.

It is possible in some instances to obtain one component of a solution in the desired degree of purity through a single crystallization. In other instances, the mutual solubility relationships of the components of a multicomponent system may be such that a fractional crystallization process is required. Theoretically only one crystallization should be required because crystals separating from a solution are presumed to have a definite composition. Practically, however, since crystals obtained from a solution of several components will be impure, more than one crystallization is necessary to obtain pure crystals. The impurity of these crystals and consequent variance in chemical composition is the result of the occlusion of solvent and other solutes within the crystals and the adsorption of these same contaminants on the surface of the crystals. In conventional fractional crystallization the crystal yield from one batch crystallization is redissolved in a second solvent or melted and again crystallized from the new solution to effect further purification. The recrystallized product will have less impurity since the concentration of impurity in the new solution is less than in the previous solution of crystallization, especially when a second solvent different from the original solvent is used to redissolve the crystals.

For example, the separation and purification of the two components of a two component system is achieved in a batch-wise manner by several crystallization and recrystallization processes. As the first step, the original liquor is cooled and crystals which are richer in one of the components are separated by partial crystallization of the liquor. These crystals are removed to another vessel where they are melted or, preferably, redissolved in a suitable solvent. As the second step of the batch process, another partial crystallization of the melted or redissolved crystals is performed giving crystals which are richer in the desired component than those crystals of the first crystallization. This process of melting or redissolving the crystals and partial recrystallization may be continued until crystals of the desired purity are obtained. The remaining liquor from the first step of the crystallization may also be subjected to another partial crystallization, thereby producing a liquor having still less of the other component than the original liquor. The partial crystallization of the liquor may be continued until the desired purity of liquor is obtained. Crystals and liquor of intermediate impurity may be recycled to the first crystallization step or subjected to further crystallization to obtain products of the desired purity.

Each crystallization step of such a fractional crystallization process is a batch operation within itself, from which crystals and liquor are subjected to a separate recrystallization or crystallization. However, the crystallization process within any particular step may be a continuous one; that is crystals of that step are continually formed and liquor and/or solvent is continually fed in and taken out. In multicomponent systems where it is desired to recover more than one component in the pure form it is necessary first to separate the components in the impure state by one step or series of steps, then in a different step or series the impure components are purified by washing, redissolving, melting or recrystallization.

These processes described require a large amount of equipment and floor space for their operation. Furthermore, labor and equipment costs in a batch process account for a substantial portion of the operating costs of the process. It is much to be desired to employ a true continuous process to substantially decrease the equipment and maintenance costs while maintaining the desired capacity.

This application is a continuation-in-part of my prior and copending application, Serial No. 571,073, filed January 2, 1945, which discloses a continuous process for the separation of a multicomponent mixture comprising passing a liquid mixture from a zone of relatively high temperature to a zone of relatively low temperature under conditions such that crystals of at least one component are formed, and passing countercurrently to the flow of said liquid mixture crystals thus formed to be removed as a crystalline product from said zone of relatively high temperature. The process of the present application constitutes an improved and alternative crystallization process as disclosed in my aforementioned copending application. The present process differs principally from the former process in that another material is introduced into the crystallization zone, preferably between the zone of relatively high temperature and the feed, which added material will exert certain effects on the system, such as an extractive effect on the crystals to remove impurities therefrom, to render a more efficient purification and separation process. Hence, the term continuous extractive crystallization has been selected to describe the invention but the term is not considered to limit the function of the added material. Both processes of the present application and my prior copending application represent an improvement over the conventional batch and continuous crystallization processes.

It is the primary object of this invention to provide a continuous process for the separation of multicomponent mixtures.

Another object of this invention is to provide a process for the separation of multicomponent systems by fractional crystallization.

Another object is to provide a process which combines the separation of a multicomponent system by fractional crystallization with a purification of the crystalline product by solvent extraction.

A further object of this invention is to provide a process for separation and purification of high-boiling hydrocarbons and hydrocarbons which are thermally unstable.

It is still a further object of this invention to provide a continuous purification process.

Another object is to provide a continuous extraction process.

It is also an object of this invention to decrease the cost of maintenance and equipment for crystallization processes.

Still another object is to increase the capacity and output in the separation of the various components of a mixture by a continuous crystallization process.

Other objects and advantages will appear obvious to those skilled in the art from the following disclosure.

The present invention comprises a continuous extractive crystallization process wherein at least one component of a multicomponent system is simultaneously separated and purified in a crystallization zone. In an application of this process, a multicomponent solution or slurry passes from a zone of relatively high-temperature to a zone of relatively low temperature within a crystallization zone under conditions of saturation to form crystals of at least one of the components. These crystals pass by virtue of their relative density or by mechanical means from the low-temperature zone to the relatively-high-temperature zone countercurrently to the saturated solution and the purified crystals are discharged adjacent the high-temperature zone as a product. Liquor, which may also be a desired product, is discharged adjacent the low-temperature zone. The temperature change from the point of highest temperature to the point of lowest temperature in the crystallization zone is gradational and represents the temperature of crystallization of a solution of a particular composition at any particular point intermediate the highest and lowest temperature. The original liquor or solution normally enters the continuous fractional crystallization system at a point between the maximum and minimum temperatures. According to this invention, an extractive material, hereinafter more fully described, is also introduced into the crystallization zone and changes the nature of the system in such a way that crystallization is aided. The process is conveniently carried out in either a series of continuous crystallizers or in a single continuous vertical tower or horizontal tank.

The extractive material which is added to the crystallization zone renders a more complete separation and purification of the desired crystalline product by exerting an extractive effect in different ways. In some cases the effect of the extractive material may be merely that of simple dissolution of the uncrystallized component of the original solution. In other cases the extractive material may form a solvate with the uncrystallized component, or it may assist in the separation of the components of the original solution by preventing the formation of a eutectic between the components of the original solution. In general, the extractive material itself or when in admixture with the liquid phase of the crystallization system should be selected from those highly selective solvents in which the desired crystalline product is substantially insoluble and which are substantially chemically inert with respect to the crystalline product under the operating conditions of the process. By "selective" is meant a material in which the desired crystallized component is relatively less soluble than the other components of the system. The principal function of the extractive material is to increase the affinity between the liquid phase surrounding the crystals and the impurity or undesired component in the crystals, or to decrease the affinity between the liquid phase in which precipitation is occurring and the crystallized component, or both.

In the preferred embodiment of this invention, a liquid extractive material is introduced into the crystallization zone between the point of highest temperature and the introduction of the multicomponent feed solution. The liquid extractive material increases the affinity between the liquid phase surrounding the crystals and the impurity in the crystals, which results in extracting the impurity from the crystals. Preferably, the liquid extractive material is miscible in the liquid phase in the crystallization zone under the operating conditions thereof. However, if desired under certain circumstances, the liquid extractive material may be only partially miscible, or even immiscible in the liquid phase without departing from the scope of this invention. When inorganic multicomponent systems are the subject of the crystallization process, water is often a desirable liquid extractive material, and when organic multicomponent systems are the subject of the crystallization process alcohol or ether may constitute the liquid extractive material.

In some instances, the extractive material may be introduced into the liquid phase of the crystallization process as a solid when the solid extractive material is soluble in the liquid or when the solid extractive material changes to the liquid phase upon contact with the liquid or the crystals, such as by the formation of a solvate. It is also within the scope of this invention to introduce the extractive material at a predetermined temperature to aid in cooling or heating of the liquid of the crystallization process. Generally however, the temperature of the extractive material is substantially equal to the temperature of the system at the point of introduction.

The present invention is not considered to be limited to the addition of only one extractive material, but covers broadly the introduction of a plurality of extractive materials either separately or in admixture with each other. The term extractive material in itself may define a single compound or a mixture of compounds having the desired characteristics according to this invention.

Most of the extractive material is removed from the crystallization system with the mother liquor and may be recovered therefrom, if desired, by various methods known to those skilled in the art, such as by distillation, evaporation, crystallization, gravity separation, solvent extraction, etc. The recovered extractive material may be recycled to the crystallization system. In many cases the relative cost of the extractive material and the cost for its recovery will determine whether the material is recovered or discarded with the mother liquor. Of course, where the mother liquor itself is also a product of the process, removal of the extractive material is usually desirable. Some of the extractive material may be entrained in the crystalline product and, if desired, may be removed from the crystalline product by evaporation, drying, or like methods.

In cases in which considerable contamination of the crystalline product with the extractive material can be tolerated, the temperature of the zone of relatively high temperature may be such that the product normally withdrawn as crystals may be withdrawn as a liquid. Further separation of this product and the extractive material may then be effected, if desired. In this modification, the amount of extractive material contaminating the product normally withdrawn as crystals may be minimized by introducing the extractive material a further distance from the point of removal of the product than normally practiced.

The novel process of this invention is applicable to the separation of multicomponent mixtures as well as two component mixtures. It is particularly applicable to the separation of hydrocarbons having close boiling points but having freezing points substantially different. In the case of hydrocarbons the normal manner of separation by stripping and extractive distillation sometimes requires high temperatures which is undesirable because many hydrocarbons are thermally unstable at these high temperatures. Thus, the separation of certain hydrocarbon mixtures by distillation or the like is practically impossible. In other cases the boiling points of the hydrocarbons may be so high that their distillation at these high temperatures is uneconomical. This invention is also applicable to inorganic mixtures as well as organic mixtures and constitutes a convenient method of separating two inorganic components between which solvates or hydrates are formed. For purposes of simplicity the discussion will be limited primarily to the separation of two component systems.

Figure 1 of the drawing is a diagrammatic illustration of apparatus which may be used for carrying out one embodiment of this invention comprising the separation of two components in a series of crystallizers interconnected for continuous crystallization. The flow of the crystals formed in the crystallizers is countercurrent to the flow of the liquid between the separate crystallizers. The liquid flows from a high-temperature crystallizer to a crystallizer at a lower temperature while the crystals pass from a low-temperature crystallizer to a crystallizer at a higher temperature, countercurrently to the flow of the liquid. For the optimum operation of the process, the liquid mixture in each crystallizer should be substantially at its saturation condition in respect to crystals. This condition of saturation will depend upon the temperature and composition of the mixture in each crystallizer and thus requires the regulation of the temperature therein to correspond to the saturation of the liquid mixture of that particular composition. Products comprising the separated components may be withdrawn from both the highest-temperature crystallizer and the lowest-temperature crystallizer in the series. As contained herein, saturated conditions refers to conditions of equilibrium between solids and liquids.

In operation for separation of a two component mixture in the series of crystallizers of Figure 1, the feed mixture enters crystallizer 3 through lines 1 and 2. The temperature of crystallizer 3 is maintained by heat exchanger 30 so that the liquid mixture within the crystallizer is at its crystallization temperature, i. e., in a saturated or super-saturated condition in respect to the formation of crystals. In this manner crystals may be formed in crystallizer 3. Liquid from crystallizer 3 is continuously withdrawn through line 4 to a crystallizer 5 in which the liquid mixture has a lower temperature than in crystallizer 3 and is at a saturated condition with respect to crystals present therein. Simultaneously crystals are continuously withdrawn from crystallizer 3 through star valve 13 into line 14 for introduction into crystallizer 15 in which the mixture is at a higher temperature than in crystallizer 3 and is also in a saturated condition with respect to crystals present therein.

A liquid extractive material having the properties hereinbefore described is introduced in crystallizer 15 through line 35, and, if desired, additional or a second extractive material may be introduced into crystallizer 5 through line 36. Circulation and mixing of crystals and liquid in crystallizer 3 may be obtained, as desired, by stirrer 25 so that intimate contact is made between crystals and saturated liquid and to maintain a relatively uniform temperature therethrough. Temperature conditions are maintained in crystallizer 5 by heat exchanger 31, which may either heat or cool the liquid in crystallizer 5 depending upon the saturation temperature required and gain or loss of heat at other parts of the crystallizer. Stirrer 24 maintains adequate mixing of both liquid and crystals in crystallizer 5. Saturated liquid passes from crystallizer 5 into a lower-temperature crystallizer 7. The liquid mixture is maintained at saturated conditions with respect to crystals in crystallizer 7 and the temperature is maintained sufficiently low to assure the continual formation of crystals therein. The temperature of crystallizer 7 is maintained by a heat-exchange means 32 in crystallizer 7. Mixing of liquid and the crystals and the maintenance of uniform temperature is aided by stirrer 23. A liquid comprising one component of the original mixture and extractive material is withdrawn by line 8.

The crystals comprising the other component of the mixture are discharged from crystallizer 7 through star valve 9 into line 10 and are conveyed to crystallizer 5 countercurrent to the flow of the liquid from crystallizer 5. The crystals from crystallizer 7 are intimately mixed with saturated liquid in crystallizer 5 and resulting crystals are withdrawn through star valve 11. These crystals are then conveyed through line 12 to crystallizer 3 where they are again intimately mixed with the saturated liquid mixture therein, and again the resulting crystals are withdrawn through star valve 13 into line 14. The crystals from line 14 are introduced into crystallizer 15 where the crystals are mixed with a saturated liquid having a higher temperature than the liquid of the previous crystallizer. The temperature within crystallizer 15 may be maintained by heat exchanger 29 within the crystallizer. Circulation of the liquid and crystals is aided by stirrer 26. Liquid is withdrawn from crystallizer 15 through line 22 and enters line 2 and crystallizer 3. Crystals from crystallizer 15 are discharged through star valve 16 into line 17 and conveyed into crystallizer 18. Crystallizer 18 is at a higher temperature than the previous crystallizers and the liquid within the crystallizer is also substantially at a saturated condition. The temperature is maintained by heat exchanger 28 within the crystallizer. Stirrer 27 aids in maintaining mixing of crystals and liquid. The final crystals comprising one component of the mixture are withdrawn through star valve 19 and line 20 as a product of the process. The liquid from crystallizer 18 passes to crystallizer 15 through line 21.

Liquor comprising the uncrystallized component of the original solution and the extractive material may be passed from crystallizer 7 through line 8 to separating means 38 for the recovery of the extractive material. Separating means 38 represents any of several means for separating and recovering the extractive material from the mother liquor, such as fractionators, extraction units, settlers, etc. The recovered extractive material may be recycled to the crystallization zone through line 41. If the recovered extractive material is at a relatively low temperature, it may constitute a means of direct cooling by recycling it to the crystallization zone at the appropriate location. Lean liquor substantially free from extractive material is withdrawn from separating means 38 via line 39 and may comprise a product of the process.

It should be noted that the crystals form at the low temperature end of the series of crystallizers and pass countercurrently to the liquid to a higher temperature crystallizer and are withdrawn as a product of the process from the high temperature end of the series of crystallizers. The liquid mixture, on the other hand, flows under substantially saturated conditions from the high temperature end to the low temperature end of the series of crystallizers. Liquid is withdrawn from the low temperature end of the crystallizer. A portion of the liquid may be recycled to the feed.

Crystals formed in crystallizer 7, the lowest temperature crystallizer, have the maximum amount of the other component contained in them as an impurity. These crystals, when placed in crystallizer 5 at a higher temperature but under saturated conditions, are partially redissolved by the extractive material or remelted; the most impure crystals dissolving and the least impure crystals remaining undissolved. New crystals may form in crystallizer 5 which correspond to the purity of the crystals remaining undissolved from crystallizer 7. In addition, the crystals remaining undissolved may grow in size by the crystallization taking place on the surface of the crystals. When the crystals from crystallizer 5 are introduced into crystallizer 3 which is at a still higher temperature than crystallizer 5, the more impure crystals are dissolved as before and the least impure crystals remain undissolved. It is not essential, however, to the operation of this process that crystals form in any of the crystallizers except crystallizer 7 which has the lowest temperature. The other crystallizers may serve merely to maintain equilibrium and contact between crystals and liquid containing the extractive material so that the more impure crystals tend to dissolve, or, in some cases, so that only the impurity itself dissolves. This will result in the purest crystals being discharged from crystallizer 18, the last crystallizer. The group of crystallizers between the feed and the low-temperature end of the series of crystallizers may act in two ways, as a continuous crystallizer (formation of crystals) and as a continuous purifier (dissolving of the impure crystals or the impurity itself).

The crystals withdrawn from crystallizer 3 and introduced into crystallizer 15 are partially redissolved or melted, the most impure crystals redissolving and the more nearly pure crystals remaining undissolved. This same function is also performed by crystallizer 18. The crystals withdrawn from this last or high temperature crystallizer are the most nearly pure crystals obtainable. Their purity will depend essentially upon the number of crystallizers and type of extractive material used. These crystallizers between the feed inlet and the highest temperature end of series serve primarily as a purification means rather than as crystallizing means because few if any crystals are formed in them.

The impurity contained or adsorbed on the surface of the crystals will comprise the other component or components of the mixture. It is the tendency of the impure crystals to redissolve or remelt at lower temperatures of saturation especially in the presence of the extractive material than pure crystals which accounts for the impure crystals rather than the pure crystals redissolving. It is essential that the liquid mixture in each of the various crystallizers should be under substantially saturated conditions with respect to crystals at its respective temperature so that only the impure crystals are redissolved. Furthermore, the presence of the extractive material will remove a large portion of the impurity from the crystals without causing the crystals of the higher melting component to redissolve.

The crystals discharged from the crystallizers may be filtered to separate the liquid, usually the extractive material, entrained in them. However, filtration is not always necessary since the crystals are continuously washed in the next crystallizer into which they are introduced. In most crystallization processes filtering is essential to completely separate crystals and liquid. Also it is often necessary that the crystals be washed free of any contaminating liquid. However, in the present process these two features are incorporated in a continuous operation so that the crystals withdrawn as a product have been washed and separated from the other component of the mixture so that the crystals are essentially free from the other component. Thus, in the normal application of the present invention, no filtering of the final product is necessary.

The crystals themselves may be conveyed from one crystallizer to the other in any convenient manner such as by screw conveyors, belt conveyors, or conduits. By placing a lower temperature crystallizer above a higher temperature crystallizer crystals may be conveyed from one crystallizer to the other by gravity and countercurrent to liquid being pumped to the other crystallizer.

In case of a multicomponent system crystalline products of different components may be withdrawn from the intermediate crystallizers as well as the end crystallizers. Thus, a crystalline product may be withdrawn from the high temperature end of the series of crystallizers and also one or more crystalline products may be withdrawn from the crystallizers intermediate the high and low temperature extremes of the series, such as from crystallizer 3 through line 33. In operation if a crystalline product is withdrawn from crystallizer 3 a portion of the crystals will continue to pass to crystallizer 15, and so on, and another crystalline product will be withdrawn from crystallizer 18. A liquid product will also be withdrawn from the low temperature end of the crystallizers.

Figure 2 of the drawing illustrates an apparatus for the operation of another modification of the present process. The crystallization is carried out in a horizontal vessel with mechanical means for transporting crystals from the low temperature to the high temperature end of the vessel. Thus, horizontal vessel 52 comprises a closed trough with a semicylindrical bottom having a conveyor means 56. One end of the vessel contains closed conduit 53 for introducing a medium for maintaining a relatively low temperature, and the other end contains closed conduit 54 for introducing a medium for maintaining a relatively high temperature.

In operation, a feed mixture is introduced through line 51 into vessel 52. Extractive material is introduced into vessel 52 on either or both sides of the feed line 51 through lines 61 and 62, and/or directly with the feed through lines 63 and 51. The liquid mixture flows horizontally to the low-temperature end of said vessel and is discharged through outlet 58. Crystals are formed at the low-temperature end of the vessel and are conveyed countercurrent to the flow of liquid containing the extractive material to the high temperature end of said vessel. Conveyor 56 may comprise a chain, or a belt with paddles 57. These paddles are perforated or made of a screen so that liquid flows through them but the crystals are retained on or by them. In this manner the crystals are moved countercurrent to the liquid by the movement of the paddles on the conveyor. In returning, the paddles travel in the direction of liquid flow and do not interfere with the flow of the liquid within vessel 52. Crystals accumulate in the high-temperature end of the semicylindrical vessel 52 and are withdrawn through star valve 59 and line 60.

Carrying out the process in a single vessel as shown in Figure 2 embodies the same principles and manner of operation as in the case of a series of crystallizers shown in Figure 1. In theory the crystallizers of Figure 1 may be placed so close together that there are no conduits for transferring the liquid and the crystals between them, thus essentially comprising a single vessel as in Figure 2. The liquid mixture flows from the high-temperature end of the vessel 52 of Figure 2 under saturated conditions with respect to crystals to the low-temperature end of said vessel and the temperature gradually decreases in the direction of flow. The crystals are formed primarily at the low-temperature end of the vessel but crystals may also form in the saturated mixture between the point of introduction of the feed and the low-temperature end of the vessel. For most satisfactory performance of the process the feed mixture is preferably introduced as a solution or a slurry under saturated conditions at a point in the vessel corresponding to these conditions. The impurities in the crystals comprising the other components of the mixture are redissolved by the liquid mixture with the aid of the extractive material as the crystals progress countercurrently to the flow of the liquid in the vessel. The displacement of liquid by the crystals being passed from the low-temperature to the high-temperature end of the vessel at least partially causes the flow of liquid in the opposite direction.

Any suitable type of conveyor may be used for transporting the crystals in the vessel, such as a flat belt conveyor, buckets, or scraping devices. Small screw conveyors in the lower portion of the vessel may also transport the crystals to the opposite end. A modified application of the screw conveyor could be used which comprises a slow speed, long pitch, spiral agitator with narrow blades set as close to the sides and bottom of the trough as possible and driven on a single shaft. This agitator serves to convey the crystals to the opposite end of the trough in a similar manner to a screw conveyor and also scrapes the crystals from the sides and bottom of the trough. The blades of the agitator lift the crystals up into the liquid medium so that there is a constant and intimate mixing of crystals and liquid. Conveyance of the crystals to the end of the vessel may also be accomplished by raising the low-temperature end of the vessel so that the vessel slopes; the crystals on falling through the liquid will fall toward the high temperature end. Upon lifting the crystals into liquid again by means of the spiral agitator the crystals again fall in the direction of the high-temperature end of the vessel. In this manner the crystals progress toward the high-temperature end while they are thrown into liquid mixture. In some cases it will be desirable to have a perforated spiral.

Any means of cooling the low-temperature end of the vessel may be used. Direct cooling by recycling a portion of the extractive material after separation from the mother liquor may be feasible under certain conditions. The actual temperature necessary at the low-temperature end of the vessel will depend upon the particular mixture from which crystals are formed. In some cases cooling water may be used and in other cases refrigerants such as propane or ammonia may be necessary. Even the surrounding atmosphere may be sufficient in many instances to cool the zone of relatively low temperature. In a similar manner various means may be used to heat the high-temperature end of the vessel. In some instances steam or hot water may be used, in others super-heated steam or gases may be necessary to maintain the appropriate temperature.

Figure 3 of the drawing is a similar embodiment of the process as that of Figure 2; however, the vessel is constructed in a vertical position rather than in a horizontal position. The vessel 72 is completely filled with liquid, the liquid passing upward and the crystals passing downward by virtue of their relative densities. In operation a feed mixture enters vessel 72 through line 71 and passes upward, and extractive material is introduced below the feed through line 81. Upon progression of the liquid mixture toward the top of the tower crystals are continuously formed. A liquid essentially free from the crystallized component, is withdrawn from the top of vessel or column 72 through line 76. The top of column 72 is cooled by cooling coils 75 through which a suitable refrigerant is passed. Crystals falling through the liquid mixture in column 72 accumulate at the bottom and are withdrawn through star valve 79 and line 80 as a product of the process. The bottom of the column 72 is maintained at a substantially higher temperature than the top of the column by means of heater 74. The liquid mixture within vessel 72 is saturated with respect to crystals and the temperature of the liquid mixture gradually decreases from the bottom to the top of the tower. As in the previous embodiments of this invention, additional products may be withdrawn at points intermediate the top and bottom of column 72 depending upon the composition of the mixture and saturation conditions of the various components of the mixture.

In some applications of this process the high-temperature zone will be at the top of the tower and the low-temperature zone will be at the bottom of the column. This will not always be the arrangement, of course, but will depend upon the characteristics of the various components of the mixtures. In those cases where the high-temperature zone is at the top of the column, the crystals usually must be conveyed by mechanical means such as by sieve conveyors or the like to the top and discharged from the tower.

In both modifications of the present invention illustrated diagrammatically in Figures 2 and 3, the mother liquor may be treated to recover the extractive material therefrom, as previously described and illustrated with regard to Figure 1. If the extractive material is recovered it may be recycled to the crystallization zone.

In general, the component of the lower freezing point will be concentrated at the low-temperature end of the vessel and the component having the higher freezing point will be collected at the high-temperature end of the vessel. In some cases when dealing with substances having negative temperature coefficients of solubility it may be necessary to gather the crystals at the low-temperature end of the vessel and to concentrate the liquid at the high-temperature end of the vessel. In the majority of cases, however, crystals will be collected at the high-temperature end of the vessel. It may be desirable in some cases to maintain sufficiently high temperature to melt the crystals at the high-temperature end of the vessel enabling their withdrawal as a liquid.

Whether a vessel is maintained in a horizontal or vertical position will often depend upon the specific gravities of the components being separated, and in some cases when the crystals have a greater density than any part of the liquid from which they are being separated it may be entirely possible to operate the process without mechanical means for moving the crystals from the cold end to the warm end. By proper design of the apparatus centrifugal force may be used to supplement or replace gravity.

Where nucleation does not readily occur a tendency toward the formation of supersaturated solutions at the low-temperature end of the crystallizer will exist. If supersaturation occurs crystals may form on the surface of the cooling means and tend to interfere with heat transfer and removal of the crystals to the high temperature end of the vessel. A suitable scraping means (not shown) will overcome this difficulty by assuring that crystals are continuously scraped from the surface of the cooling means.

The crystals and liquid mixture within the vessel or the series of crystallizers are at all times substantially at equilibrium under the particular conditions of temperature and composition. To accomplish such equilibrium the temperature between the high temperature and the low temperature must be gradational and be of such an amount as to correspond to the saturation temperature with respect to crystals of the particular mixture at any particular point. Under normal conditions the system itself will acquire this gradational temperature and equilibrium phenomenon by virtue of the crystals moving countercurrently to the liquid from a low-temperature to a high-temperature zone. At each end of the vessel the composition of the mixture is extremely high in one component and extremely low in the other but conditions of saturation still exist.

The flow of liquid in one direction as required by this process is brought about by two factors; one is the introduction of the feed and extractive material and removal of a liquid mixture and the other is the melting or redissolving of the crystals and their movement through the liquid mixture in a countercurrent direction displacing liquid which must flow in the opposite direction to the crystals. Only a portion of the crystals are removed, the remainder accumulate and redissolve.

For clarity, the zone between the point of removal of crystals and the point of introduction of the extractive material may be considered in most instances the washing or purification section of the process. That zone between the point of introduction of the extractive material and the point of introduction of the feed (when the extractive material is introduced between the point of removal of crystals and the feed) may be considered the leaching or extraction section, and that zone between the feed and the removal of the mother liquor may be considered the crystallization section of the process. In the purification section the liquid mixture is highly concentrated with the crystallized component. In the extraction section the liquid mixture is highly concentrated with the extractive material, and in the crystallization phase the liquid mixture is highly concentrated with the uncrystallized component.

This process is applicable to multicomponent mixtures as well as two component systems. Application to multicomponent mixtures, however, would require further adjustment of crystallization conditions and, in some cases, means for withdrawing several crystalline products. In the case of components forming eutectics, the eutectic will be a product of the process, unless the extractive material prevents the formation of the eutectic as will often be the case.

The vessel or trough used in the application illustrated in Figure 2 may be an open vessel as well as a closed one. In case the vessel is an open one exposing the surface of the liquid mixture to the atmosphere, the evaporation of the more volatile component may aid in the crystallization and separation of the less volatile components. In many cases therefore it may be desirable to have an open vessel since the evaporation of the more volatile component at the high temperature end of the vessel will concentrate the mixture even more with respect to the less volatile component or component that is being crystallized.

A typical application of the present process of fractional crystallization is the dewaxing of petroleum oils. Separation of waxes from petroleum oils by distillation is practically impossible since the boiling ranges of the waxes and oils are very close. Much of the dewaxing at present, therefore, is accomplished by selective solvent extraction of the waxes. By extractively crystallizing the waxes by the process of this invention an almost complete separation of waxes and oils can be obtained. The waxes are simultaneously separated from the oils and are purified by contacting the waxes with a selective solvent, such as liquid propane or butane, which has been added to the crystallization zone according to this invention. In this way a petroleum oil con be obtained substantially free of wax, and a purified wax of the desired quality can be recovered as a wax product.

Having described a preferred form of my invention and having pointed out the principal considerations to be observed in the application of the invention to various processes, it is obvious that various modifications can be made without departing from the scope of the invention by one skilled in the art. For example, obviously external means of heat exchange as well as internal means may be used to adjust the temperature in the various zones of the crystallization process.

I claim:

1. The continuous process for the separation and purification of a multicomponent organic mixture from which crystals containing at least two components of different melting points separate upon cooling, which comprises continuously introducing a liquid organic multicomponent feed mixture into a horizontally elongated separation zone at a point intermediate the ends thereof; maintaining indirect heat-exchange zones in each end section of said separation zone and regulating heat-exchange therein so as to maintain a temperature in one end of said zone at the approximate melting point of the highest melting component of said mixture and a temperature at the other end of said zone at least as low as the solidification point of multicomponent crystals and above the solidification point of the entire mixture; continuously passing said liquid toward the low temperature end so as to form multicomponent crystals; continuously introducing a selective liquid extractive material for the lower melting components of said crystals into said zone intermediate the ends thereof; continuously mechanically passing the crystals thus formed toward the high temperature end thereby gradually raising the temperature thereof and contacting the crystals with extractive liquid so as to remove lower melting component from said crystals; and continuously recovering separated component from said high temperature end and extractive material and lean liquor from said low temperature end.

2. The process of claim 1 in which the temperature in said high temperature end is maintained above the melting temperature of said highest melting component and said component is recovered in liquid form.

3. The process of claim 1 in which said high temperature end is maintained just below the melting point of said highest melting component and said component is recovered in solid form.

4. A continuous process for the separation and purification of a multicomponent organic mixture from which crystals containing at least two components of different melting points separate upon cooling, which comprises continuously introducing a liquid feed of said mixture into a vertically elongated zone at a point intermediate the ends thereof; continuously passing liquid mixture upwardly in said zone; maintaining the upper end of said zone at a temperature at least as low as the solidification point of multicomponent crystals by indirect heat-exchange and above the solidification point of the entire mixture so as to form multicomponent crystals therein; maintaining the lower end of said zone just above the melting temperature of the highest melting component of said mixture by indirect heat-exchange; continuously introducing a selective liquid extractive material for the lower melting components of said crystals into said zone at a point intermediate the ends thereof; continuously moving said crystals downwardly through said zone countercurrent to said upwardly flowing mixture and extractive material so as to gradually raise the temperature of said crystals and remove lower melting components therefrom thereby purifying the highest melting component and finally melting the higher melting component; continuously passing a portion of the melted higher melting component toward the low temperature zone as reflux; and continuously recovering separated and purified component in liquid form from said high temperature end and extractive material and liquor lean in said component from said low temperature end.

5. The process of claim 4 in which said feed is introduced at the temperature of said zone at the point of introduction.

6. The process of claim 4 in which the extractive material is introduced intermediate the point of introduction of the feed and the high temperature end of said zone at the temperature of the mixture at the point of introduction.

7. A continuous process for the separation of a hydrocarbon from a mixture containing other hydrocarbons having lower melting points and from which multicomponent crystals containing said hydrocarbon and at least one of said other hydrocarbons separate upon cooling, which comprises continuously introducing said mixture into an extended separation zone at a point intermediate the ends thereof; continuously introducing a selective extractive material for said other hydrocarbons into said separation zone intermediate the ends thereof; maintaining indirect heat-exchange zones in each end section of said separation zone and regulating heat-exchange therein so as to maintain a temperature in one end of said zone just above the melting point of said hydrocarbon and a temperature in the other end thereof below the solidification point of said multicomponent crystals but above the solidification point of the entire mixture so as to form said crystals; continuously mechanically passing said crystals through said zone toward the higher temperature end thereof countercurrent to the flow of liquid therein, including said extractive material, so as to gradually raise the temperature of said crystals and remove said other hydrocarbons therefrom; continuously passing a portion of the melted higher melting component toward the low temperature zone as reflux; and continuously recovering said hydrocarbon in liquid form from the higher temperature end and extractive material and a hydrocarbon fraction lean in said hydrocarbon from the lower temperature end of said zone.

8. A continuous process for separation and purification of a liquid multicomponent organic system from which solid discrete particles containing at least two components of said system having different melting points separate upon lowering the temperature thereof, which comprises passing said liquid from a higher temperature zone to a lower temperature zone maintained by indirect heat-exchange at a temperature below the solidification point of said discrete particles but above the solidification point of the whole system so as to form said discrete particles; continuously introducing a selective extractive material, liquid under the conditions in said zones, to said higher temperature zone; continuously mechanically moving the particles thus formed toward said higher temperature zone countercurrently to the flow of liquid, including said extractive material, so as to gradually increase the temperature of said particles and decrease the concentration of the lower melting components therein, thereby purifying the higher melting component; continuously introducing heat to said higher temperature zone and withdrawing heat from said lower temperature zone by indirect heat-exchange therein so as to maintain an effective temperature gradient between said zones; continuously introducing said liquid at a point intermediate said zones and at a temperature intermediate the temperatures thereof so as to maintain the lower temperature zone as an essentially crystallization zone and the higher temperature zone as an essentially purification zone; and continuously recovering purified component of said system from said higher temperature zone and extractive material and liquor lean in said component from said lower temperature zone.

9. The process of claim 8 in which the higher temperature zone is maintained just above the melting point of said higher melting component and said component is recovered in liquid form.

10. A continuous process for separation and purification of a binary liquid organic mixture of components having different melting points from which solid discrete particles containing both components separate upon cooling, which comprises continuously introducing said liquid mixture at a temperature of imminent solid formation into a horizontal separation zone intermediate the ends thereof; maintaining a temperature in one end of said zone below the solid formation temperature of said particles but above the solidification point of the entire mixture by indirect heat exchange within said zone so as to form said discrete particles therein; maintaining the opposite end of said zone just above the melting temperature of the higher melting component of said particles by indirect heat exchange therein; continuously introducing a selective liquid extractive material for the lower melting component at an intermediate point in said separation zone; gradually mechanically passing discrete particles formed in said separation zone toward the higher temperature end and liquor containing the extractive liquid toward the lower temperature end so as to gradually melt lower melting component from said particles and purify the higher melting component; continuously passing a portion of the melted higher melting component toward the low temperature zone as reflux; continuously recovering higher melting component in liquid form as a product from the higher temperature end of said zone and a liquid lean in said higher melting component from the lower temperature end of said zone.

11. A continuous process for the separation of a liquid hydrocarbon from a liquid mixture comprising said hydrocarbon and at least one other hydrocarbon having a lower melting point from which mixture solid discrete particles containing said hydrocarbons separate upon cooling, which comprises cooling such a mixture so as to form multicomponent crystals containing said hydrocarbons; continuously introducing the thus formed slurry of particles and mixture into an intermediate section of a horizontal liquid separation zone; continuously introducing a selective liquid extractive material for said other hydrocarbon into said intermediate section; maintaining by indirect heat-exchange one end of said zone just above the melting point of the higher melting hydrocarbon and the opposite end at a temperature below the solidification point of said multicomponent particles but above the temperature at which the entire mixture solidifies; continuously passing liquid mixture containing said extractive material toward the cooler end of said zone so as to form additional multicomponent particles; continuously mechanically moving multicomponent particles toward the warmer end of said zone so as to gradualy remove the lower melting hydrocarbon from said particles and increase the concentration of the higher melting hydrocarbon therein by melting and extraction; continuously passing a portion of the melted higher melting component toward the low temperature zone as reflux; and continuously recovering higher melting hydrocarbon in liquid form from said warm end and extractive material and a hydrocarbon fraction lean in said higher melting hydrocarbon from the cooler end of said zone.

PHILIP M. ARNOLD.

REFERENCES CITED

The following references are of record in the file of this patent:

UNITED STATES PATENTS

| Number | Name | Date |
|---|---|---|
| 1,880,925 | Eissner | Oct. 4, 1932 |
| 2,147,222 | Treub | Feb. 14, 1939 |
| 2,164,769 | Govers | July 4, 1939 |
| 2,246,982 | Nederbragt | June 24, 1941 |
| 2,302,431 | Dons et al. | Nov. 17, 1942 |
| 2,307,130 | Henry et al. | Jan. 5, 1943 |
| 2,322,438 | Henry et al. | June 22, 1943 |
| 2,410,483 | Dons et al. | Nov. 5, 1946 |

OTHER REFERENCES

Perry, "Chemical Engineer's Handbook," second edition, pages 1782–1783, pub. by McGraw-Hill, N. Y., 1941.